US00RE34431E

United States Patent [19]

Brunelle et al.

[11] E Patent Number: Re. 34,431

[45] Reissued Date of Patent: Nov. 2, 1993

[54] MACROCYCLIC OLIGOMERS CONTAINING SPIRO(BIS)INDANE MOIETIES

[75] Inventors: Daniel J. Brunelle; Thomas L. Guggenheim, both of Scotia; James A. Cella, Clifton Park; Thomas L. Evans, Clifton Park; Luca P. Fontana, Clifton Park; Gary R. Faler, Scotia; James M. Fukuyama, Clifton Park; Eugene P. Boden, Scotia; Jonathan D. Rich, Rexford, all of N.Y.; Thomas G. Shannon, Evansville, Ind.; Sharon J. McCormick, Schenectady, N.Y.; Philip J. McDermott, Clifton Park, N.Y.; Alice M. Colley, Latham, N.Y.; Joseph W. Guiles, Ft Collins, Colo.

[73] Assignee: General Electric Company, Schenectady, N.Y.

[21] Appl. No.: 915,381

[22] Filed: May 8, 1992

Related U.S. Patent Documents

Reissue of:

[64] Patent No.: 4,980,453
Issued: Dec. 25, 1990
Appl. No.: 146,154
Filed: Jan. 20, 1988

U.S. Applications:

[63] Continuation-in-part of Ser. No. 887,503, Jul. 21, 1986, Pat. No. 4,736,016, and a continuation-in-part of Ser. No. 920,540, Oct. 20, 1986, Pat. No. 4,757,132, and a continuation-in-part of Ser. No. 20,264, Feb. 27, 1987, Pat. No. 4,808,754, and a continuation-in-part of Ser. No. 26,517, Mar. 17, 1987, Pat. No. 4,789,725, and a continuation-in-part of Ser. No. 64,650, Jun. 22, 1987, Pat. No. 4,837,298.

[51] Int. Cl.[5] ..... C08G 63/00; C08G 69/42; C07D 231/00; C07F 7/04

[52] U.S. Cl. ..... 528/352; 528/185; 528/190; 528/195; 528/298; 548/110; 556/419

[58] Field of Search ..... 528/352, 185, 190, 195, 528/298; 548/110; 556/419

[56] References Cited

U.S. PATENT DOCUMENTS

| | | | |
|---|---|---|---|
| 3,725,070 | 4/1973 | Hamb et al. | 430/533 |
| 3,856,752 | 12/1974 | Baterman et al. | 528/229 |
| 4,734,482 | 3/1988 | Tamai et al. | 528/185 |
| 4,736,016 | 4/1988 | Brunelle et al. | 528/370 |
| 4,757,132 | 7/1988 | Brunelle et al. | 528/370 |
| 4,789,725 | 12/1988 | Guggenheim et al. | 528/201 |
| 4,795,680 | 1/1989 | Rich et al. | 428/450 |
| 4,826,916 | 5/1989 | Policastro et al. | 528/26 |
| 4,837,298 | 6/1989 | Cella et al. | 528/352 |
| 4,864,034 | 9/1989 | Cella et al. | 548/473 |

*Primary Examiner*—John Kight, III
*Assistant Examiner*—P. Hampton-Hightower
*Attorney, Agent, or Firm*—William H. Pittman

[57] ABSTRACT

Macrocyclic oligomers, including polycarbonates, polyesters, polyamides, polyimides, polyetherketones and polyethersulfones, are conveniently prepared from various spiro(bis)indane compounds, especially the 6,6'-difunctional 3,3',3'-tetramethylspiro(bis)indanes. The macrocyclic oligomers may be conveniently converted to linear polymers.

21 Claims, No Drawings

MACROCYCLIC OLIGOMERS CONTAINING SPIRO(BIS)INDANE MOIETIES

Matter enclosed in heavy brackets [ ] appears in the original patent but forms no part of this reissue specification; matter printed in italics indicates the additions made by reissue.

This applicatation is a continuation-in-part of the following copending applications:

- Ser. No. 887,503, filed July 21, 1986, now U.S. Pat. No. 4,736,016;
- Ser. No. 920,540, filed Oct. 20, 1986, now U.S. Pat. No. 4,757,132;
- Ser. No. 20,264, filed Feb. 27, 1987, now U.S. Pat. No. 4,808,754;
- Ser. No. 26,517, filed Mar. 17, 1987, now U.S. Pat. No. 4,789,725; and
- Ser. No. 64,650, filed June 22, 1987, now U.S. Pat. No. 4,837,298.

This invention relates to macrocyclic oligomers, and more particularly to their preparation from compounds uniquely capable of conversion thereto.

U.S. Pat. Nos. 4,644,053 and 4,696,998 disclose cyclic polycarbonate oligomers and cyclic heterocarbonates, which are capable of conversion to high molecular weight linear homo- and copolycarbonates under reactive processing conditions. Cyclic polyarylates of similar molecular structure are disclosed in the aforementioned copending application Ser. No. 920,540. While cyclic materials of this kind are often capable of formation from a wide variety of organic dihydroxy compounds, yields are often low because the geometries of said organic dihydroxy compounds are not favorable for cyclization, preferring the formation of linear polymers.

The present invention is based on the discovery that compounds containing spirobiindane moieties are uniquely and generically capable of forming a broad spectrum of macrocyclic oligomers, often in preference to linear polymers. It is possible, however, to convert said oligomers by relatively simple means to linear polymers having a wide scope of utilities.

As broadly defined, therefore, the invention includes compositions comprising random macrocyclic monomer and oligomer compounds corresponding to the formula $$\left(A^1-Z^1\right)_a\left(R^1-Z^1\right)_b \qquad \text{(I)}$$

wherein the $Z^1$ radicals are identical linking groups; $A^1$ is a spiro(bis)indane moiety of the formula

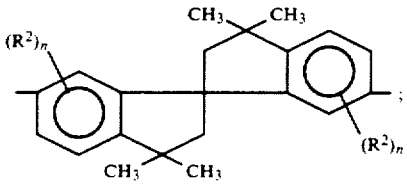

(II)

about 60% of the $R^1$ groups are divalent aromatic organic radicals and the balance thereof are divalent aliphatic, alicyclic or aromatic organic radicals; each $R^2$ is independently $C_{1-4}$ primary or secondary alkyl or halo;

a is from 1 to about 12, b is from 0 to 90% of total —A—Z—and —$R^1$—$Z^1$—moieties and n is 0–3.

As used herein, the term "macrocyclic oligomer" denotes compounds in which the spiro(bis)indane groups are part of a larger ring structure. Thus, the mere fact that the $A^1$ moiety is itself cyclic is not significant to the macrocyclic nature of the compound; rather, the presence of a larger ring structure is mandatory.

The spiro(bis)indane units of formula II are obviously derived from 6,6'-difunctional 3,3,3',3'-tetramethylspiro(bis)indanes (hereinafter sometimes simply "spirobiindanes"), which may be substituted or unsubstituted. The $R^2$ values therein may be alkyl radicals such as methyl, ethyl, 1-propyl or 2-propyl, or halo atoms such as chloro or bromo. Among compounds containing such $R^2$ values, methyl and chloro are preferred; however, the most preferred compounds are the 6,6'-difunctional 3,3,3',3'-tetramethylspiro(bis)indanes, in which n is 0.

The compositions of the invention include macrocyclic monomers containing only one—$A^1$—$Z^1$—moiety. Most often, however, said compositions are mixtures of oligomers containing at least two of said moieties. The linking $Z^1$ moieties, all of which are identical, are usually ether, ester, amide, imide or amic acid precursor thereof, or carbonate moieties or larger organic groups containing such moieties.

The $R^1$ values, if present, may be different but are usually the same. In general, the tendency to form macrocyclic oligomers decreases with an increase in the proportion of—$R^1$—$Z^1$—moieties in the molecule. Said proportion, as a percentage of the number of total moieties present, is most often about 10–90% and preferably up to about 50%.

At least about 60% of the total number of $R^1$ values are aromatic and the balance may be aliphatic, alicyclic, aromatic or mixed; those which are aliphatic or alicyclic generally contain up to about 8 carbon atoms. The [$R^2$] *$R^1$* values may contain substituents such as halo, nitro, alkoxy, lactone and the like. Most often, however, all $R^1$ radicals are hydrocarbon radicals.

Preferably at least about 80% of the total number of $R^1$ values in the macrocyclic oligomer compositions, and most desirably all of said $R^1$ values, are aromatic. The aromatic $R^1$ radicals preferably have the formula $$-A^2-Y^1-A^3- \qquad \text{(III)}$$

wherein each of $A^2$ and $A^3$ is a monocyclic divalent aromatic radical and $Y^1$ is a bridging radical in which one or two atoms separate $A^1$ from $A^2$. The free valence bonds in formula III are usually in the meta or para positions of $A^2$ and $A^3$ in relation to $Y^1$.

In formula III, the $A^2$ and $A^3$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^2$ and $A^3$ are preferably p-phenylene, although both may be o- or m-phenylene or one o- or m-phenylene and the other p-phenylene.

The bridging radical, $Y^1$, is one in which one or two atoms, preferably one, separate $A^2$ from $A^3$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone.

The copolymeric compositions of this invention are random copolymers; that is, the distribution of the—$A^1$—$Z^1$—and—$R^1$—$Z^1$—moieties in each molecule is random. In this sense, formula I is only a stylized structural formula since it suggests a block copolymer structure which is not contemplated.

In its broadest sense, therefore, the invention includes a wide variety of macrocyclic oligomers containing spirobiindane moieties. Oligomers containing the following structural units are illustrative; in these structures, $A^1$ represents the spirobiindane moiety of formula II.

Polycarbonate:

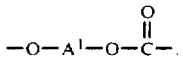

(IV)

Polyester:

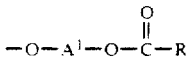

(V)

wherein $R^3$ is a divalent aliphatic or m- or p-linked monocyclic aromatic or alicyclic radical.

Polyamide—includes the following:

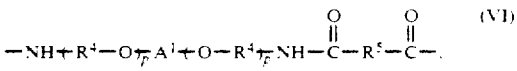

(VI)

wherein:

$R^4$ is a substituted or unsubstituted $C_{2-4}$ alkylene, m-phenylene or p-phenylene radical;

$R^5$ is a substituted or unsubstituted alkylene radical or arylene radical other than o-arylene; and p is 0 or 1; and

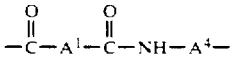

(VII)

wherein $A^4$ is a monocyclic or bicyclic m- or p-linked arylene radical or

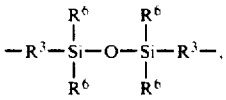

(VIII)

$R^6$ is $C_{1-4}$ primary or secondary alkyl, phenyl or substituted phenyl and $R^3$ is as previously defined.

Polyimide and polyamideimide (and polyamic acid precursors thereof) - includes the following:

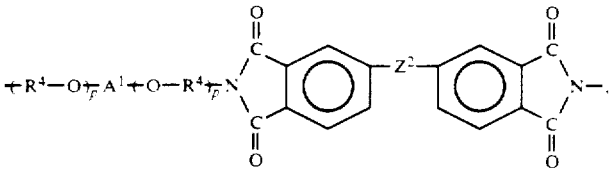

wherein:

$Z^2$ is a single bond, a divalent aliphatic or alicyclic radical containing about 1-12 carbon atoms, —O—, —CO—, —S—, —$SO_2$—, —O-Q-O—, —$SO_2$-Q-$SO_2$—,

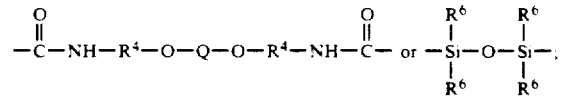

Q is a divalent aliphatic or aromatic radical; and $R^4$, $R^6$ and p are as previously defined; and

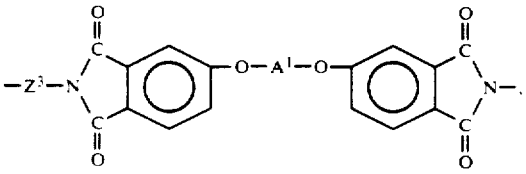

(X)

wherein $Z^3$ is $R^3$ or —$R^4$—$Z^4$—$R^4$—or has formula VIII, $Z^4$ is

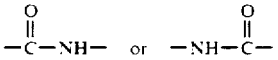

and $R^3$ and $R^4$ are previously defined.

Polyetherketone and polyethersulfone:

$$-O-A^1-O-A^5- \quad \text{(XI)}$$

wherein $A^5$ is an aromatic radical containing at least one —CO—or [—$SO_2$] —$SO_2$—group.

Consideration will now be given to each of these types of oligomers in detail, with preferred parameters and illustrative methods of preparation.

Polycarbonates

Macrocyclic polycarbonate oligomer compositions corresponding to formula IV, and corresponding copolycarbonates, may be prepared by contacting a composition comprising at least one compound of the formula $$Y^2O-A^1-OY^2 \quad \text{(XII)}$$

or a mixture thereof with at least one compound of the formula $$Y^3O-R^2-OY^3 \quad \text{(XIII)}$$

wherein $R^2$ is as previously defined, the $Y^2$ and $Y^3$ values in each compound are both H or

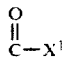

and $X^1$ is chlorine or bromine, at least about 75% of the total number of $Y^2$ and $Y^3$ moieties being $$[\overset{O}{\overset{\|}{C}}-X^1] \quad (IX)]$$

with at least one oleophilic aliphatic or heterocyclic tertiary amine and an aqueous alkali or alkaline earth metal hydroxide or carbonate solution (hereinafter sometimes "base"), in a substantially non-polar organic liquid which forms a two-phase system with water. The details of preparation are similar to those for preparing cyclic polycarbonate oligomer mixtures as described in the aforementioned U.S. Pat. No. 4,644,053, the disclosure of which is incorporated by reference herein.

It will be apparent from the foregoing that at least one of the compounds of formulas XII and XIII must be a bishaloformate. While the $X^1$ values therein may be chlorine or bromine, the bischloroformates, in which $X^1$ is chlorine, are most readily available and their use is therefore preferred. Reference to bischloroformates hereinafter will frequently include all compounds of formulas XII and XIII when the context permits. It should be understood, however, that other bishaloformates may be substituted for the bischloroformates as appropriate.

The bischloroformates comprise a major proportion of the compounds of formulas XII and XIII, at least about 60%, preferably at least about 75% and most preferably at least about 90% of the total number of $Y^2$ and $Y^3$ moieties being chloroformate moieties. Any remaining compounds of formulas XII and XIII are dihydroxy compounds, preferably bisphenols.

When the compound of formula XII is free 6,6'-dihydroxy-3,3,3',3'-tetramethylspiro(bis)indane (hereinafter SBI), it may be necessary to employ a minor proportion of a solvent therefor, such as tetrahydrofuran, to ensure its dissolution in the reaction mixture. Most often, however, bischloroformates alone are used.

The proportions of compounds of formulas XII and XIII in the reaction mixture will depend on whether the cyclic composition being prepared is a homopolycarbonate (whereupon only the compound of formula XII will be used) or a copolycarbonate. The copolycarbonates generally comprise at least about 10 mole percent of units of formula IV, and therefore require at least about 10 mole percent of the compound of formula XII in the reaction mixture, the balance having formula XIII.

Any bischloroformates may be employed in substantially pure, isolated form. For this purpose, it is possible to prepare SBI bischloroformate by a variation of the method described in Example 4 of British Pat. 613,280, substituting diethylaniline for the dimethylaniline recited therein.

It is frequently preferred, however, to use one or more crude bischloroformate products. Suitable crude products may be prepared by any known methods for bischloroformate preparation. Typically, at least one bisphenol (and, for the preparation of copolycarbonates, a mixture of bisphenols such as those of bisphenol A and SBI) is reacted with phosgene in the presence of a substantially inert organic liquid, as disclosed in the following United States patents:

| | |
|---|---|
| 3,255,230 | 3,966,785 |

-continued

| | |
|---|---|
| 3,312,661 | 3,974,126. |

The disclosures of these patents are incorporated by reference herein.

In addition to the bisphenol bischloroformate, such crude bischloroformate products may contain oligomer bischloroformates. Most often, a major proportion of the crude product comprises monomer, dimer and trimer bischloroformate. Higher oligomer bischloroformates, and monochloroformates corresponding to any of the aforementioned bischloroformates, may also be present, preferably only in relatively small amounts.

More preferably, the preparation of the crude bischloroformate product takes place in the presence of aqueous alkali. The pH of the reaction mixture may be up to about 12. It is generally found, however, that the proportion of high polymer in the cyclic oligomer mixture is minimized by employing a crude bischloroformate product comprising a major amount of bisphenol bischloroformate and only minor amounts of any oligomer bischloroformates. Such products may be obtained by a variant of the method disclosed in U.S. Pat. No. 4,638,077, the disclosure of which is also incorporated reference herein.

In that method, phosgene is passed into a mixture of a substantially inert organic liquid and a bisphenol, said mixture being maintained at a temperature within the range of about 10–40° C., the phosgene flow rate being at least 0.15 equivalent per equivalent of bisphenol per minute when the temperature is above 30° C. An aqueous alkali metal or alkaline earth metal base solution is simultaneously introduced as necessary to maintain the pH in the range of about 0.5–8.0. By this method, it is possible to prepare bischloroformates of compounds such as bisphenol A in high yield while using a relatively small proportion of phosgene, typically up to about 1.1 equivalent per equivalent of bisphenol.

For the preparation of SBI bischloroformate compositions, the above-described method is not satisfactory since SBI swells and gels in water-methylene chloride mixtures at low pH. The monochloroformate of SBI is, however, apparently soluble in such mixtures (particularly in the methylene chloride phase thereof).

Therefore, it is possible to prepare SBI bischloroformate compositons by passing phosgene into a heterogeneous mixture of solid SBI, a substantially inert organic liquid (e.g., methylene chloride) and an aqueous alkali metal or alkaline earth metal base solution, said mixture being maintained at a temperature within the range of about 10°–40° C. and at a pH of the aqueous phase in the range of about 8–14, until all solids have dissolved, and then continuing phosgene passage as the pH is decreased to a value in the range of 2–8, preferably 2–5. This method is disclosed and claimed in copending, commonly owned application Ser. No. 926,685, filed Nov. 4, 1986.

When one of these methods is employed, it is obvious that the crude bischloroformate product will ordinarily be obtained as a solution in a substantially non-polar organic liquid such as those disclosed hereinafter. Depending on the method of preparation, it may be desirable to wash said solution with a dilute aqueous acidic solution to remove traces of base used in preparation.

The tertiary amines ("tertiary" in this context denoting the absence of N—H bonds) generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in U.S. Pat. Nos. 4,217,438 and 4,368,315, the disclosures of which are incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and the compounds of formulas XII and XIII is essential for the formation of the monocyclic oligomer composition. For the most part, such amines contain at least about 6 and preferably about 6-14 carbon atoms.

The most useful amines are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Suitable aqueous alkali or alkaline earth metal hydroxide or carbonate solutions include lithium, sodium, potassium and calcium hydroxide and sodium and potassium carbonate. Lithium, sodium or potassium hydroxide are most often used, with sodium hydroxide being preferred because of its availability and relatively low cost. The concentration of the solution is not critical and may be about 0.1-16 M, preferably about 0.2-10 M.

The fourth essential component in the macrocyclic polycarbonate oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran. Methylene chloride is generally preferred.

To prepare the macrocyclic polycarbonate oligomer composition according to the above-described method, the reagents and components are maintained in contact under conditions whereby the bischloroformates are present in low concentration. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the bischloroformates (and optionally other reagents) are added gradually to a reaction vessel containing solvent.

Although addition of said bischloroformates neat (i.e., without solvents) is within the scope of this embodiment, it is frequently inconvenient because many bischloroformates are solids. Therefore, they are preferably added as a solution in a portion of the organic liquid, especially when they consist essentially of bischloroformate. The proportion of organic liquid used for this purpose is not critical; about 25-75% by weight, and especially about 40-60%, is preferred.

The reaction temperature is generally in the range of about 0°-50° C. It is most often about 0°-40° C. and preferably 20°-40° C.

For maximization of the yield and purity of macrocyclic polycarbonate oligomers as opposed to high polymer and insoluble and/or intractable by-products, it is preferred to use not more than about 1.5 mole of bischloroformates, calculated as bisphenol bischloroformate, per liter of organic liquid in the reaction system, including any liquid used to dissolve said compounds. Preferably, about 0.003-1 0 mole of said compounds is used when it consists entirely of bischloroformate, and no more than about 0.5 mole is used when it is a bisphenol-bischloroformate mixture. It should be noted that this is not a molar concentration in the organic liquid when said compounds are added gradually, since they are consumed as they are added to the reaction system.

The molar proportions of the reagents constitute another important feature for yield and purity maximization. The preferred molar ratio of amine to compounds of formulas [XIV] *XII* and [XV] *XIII* when said compounds consist essentially of bischloroformates is about 0.1-1.0:1 and most often about 0.15-0.6:1, and that of base to said compounds is about 1.5-3:1 and most often about 2-3:1. When a bischloroformate-bisphenol combination is used, the preferred molar ratio for amine is about 0.1-0.5:1.

A highly preferred method for preparing the macrocyclic polycarbonate oligomer compositions of this invention comprises conducting the reaction using as the amine at least one aliphatic or heterocyclic tertiary amine which, under the reaction conditions, dissolves preferentially in the organic phase of the reaction system, and gradually adding the bischloroformates and at least a portion of the amine and base simultaneously to the organic liquid or to a mixture thereof with water, said liquid or mixture being maintained at a temperature in the range of about 0°-50° C.; the amount of bischloroformates used being up to about 0.7 mole for each liter of organic liquid present in the reaction system, and the total molar proportions of amine and base, respectively, to bischloroformates being approximately 0.06-2.0:1 and 2-3:1, respectively; and recovering the cyclic oligomers thus formed.

A factor of some importance in this embodiment is the concentration of available amine, which should be maintained at a level as constant as possible during the entire bischloroformate addition period. If all of the amine is present in the reaction vessel into which the amine is introduced, its concentration steadily decreases, principally by dilution. On the other hand, if the amine is introduced continuously or in equal increments during introduction of bischloroformate, its available concentration is initially low and increases more or less steadily during the addition period. These fluctuations can result in a high and constantly varying proportion of high polymer in the product.

It has been found advantageous to introduce the amine in one initial large portion, usually about 40-95% and preferably about 40-75% by weight of the total amount, followed by incremental or continuous addition of the balance thereof. By this procedure, the concentration of available amine is maintained at a fairly constant level in the organic phase during the entire addition period, and it is possible to minimize the proportion of high polymer in the product. Typically, high polymer content is 10% or less when this mode of addition is used.

Under these conditions, it is usually advantageous for the reactionv essel to initially contain about 5–40% and preferably about 5–30% of total base. The balance thereof is also introduced continuously or incrementally. As in the embodiment previously described, another portion of organic liquid may serve as a solvent for the bischloroformates.

Among the other principal advantages of this preferred embodiment are the non-critically of the degree of dilution of the reagents and the ability to complete the addition and reaction in a relatively short time, regardless of [reactions] *reaction* scale. It ordinarily takes only about 25–30 minutes to complete cyclic oligomer preparation by this method, and the cyclic oligomer yield may be 85–90% or more. By contrast, use of a less preferred embodiment may, depending on reaction scale, require an addition period as long as 8–10 hours.

In this preferred embodiment, the pH of the reaction mixture is typically in the range of about 9–14 and preferably about 12. When the bischloroformates (and optionally the amine) are added to all of the base, on the other hand, the initial pH remains on the order of 14 during essentially the entire reaction period.

When the reaction has been completed, impurities may be removed in the necessary amounts by conventional operations such as combining the crude product, as a solid or in solution, with a [on-solvent] *non-solvent* for said impurities. Illustrative non-solvents include esters such as methyl acetate and ethyl acetate.

Recovery of the macrocyclic polycarbonate oligomers normally means merely separating the same from diluent (by known methods such as vacuum evaporation) and, optionally, from high polymer and other impurities. The degree of sophistication of recovery will depend on such variables as the intended end use of the product. Among the macrocyclic copolycarbonates contemplated as part of the invention are macrocyclic polyphenylene ether-polycarbonates containing, in addition to the structural units of formula IV, units corresponding to —$R^1$—$Z^1$—which have the formula (XIV)

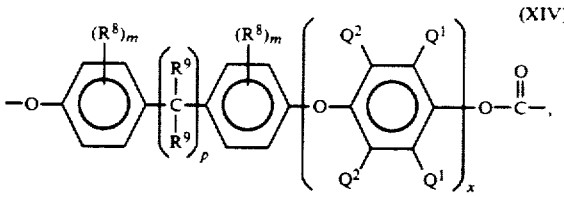

wherein:

each $Q^1$ is independently halogen, primary or secondary lower alkyl (i.e., alkyl containing up to 7 carbon atoms), phenyl or hydrocarbonoxy;

each $Q^2$ is independently hydrogen, halogen, primary or secondary lower alkyl, phenyl or hydrocarbonoxy;

each $R^8$ is independently $C_{1-8}$ primary or secondary alkyl, phenyl or halo;

each $R^9$ is independently hydrogen, methyl, ethyl or phenyl;

m is from 0 to 4;

x is from 1 to about 5; and p is as previously defined.

The moieties of formula XIV therein may or may not contain a methylene or substituted methylene bridge linking two of the aromatic rings (according as p is 1 or 0). The substituents on said bridge, if any, are methyl, ethyl or phenyl, with methyl being preferred. Especially preferred are the compounds in which each $R^9$ is methyl, m is 0 and p is 1; that is, compounds derived from bisphenol A.

Also present in the moiety of formula XIV are from 1 to about 5, and preferably from 1 to 3, phenylene ether units. Examples of suitable primary lower alkyl groups suitable for $Q^1$ and $Q^2$ therein are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any such alkyl radicals are straight chain rather than branched. Most often, each $Q^1$ is alkyl or phenyl, especially $C_{1-4}$ alkyl and preferably methyl, and each $Q^2$ is hydrogen.

The macrocyclic polyphenylene ether-polycarbonates may be prepared by the above-described polycarbonate process, substituting for the compound of formula XIII at least one oligomeric compound of the formula (XV)

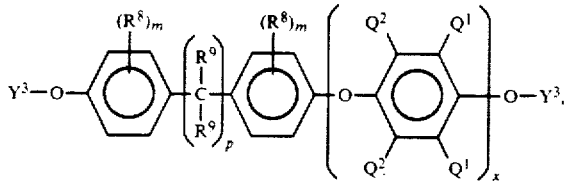

wherein $Q^1$, $Q^2$, $R^8$, $R^9$, $Y^3$, m and p are as defined hereinabove, and otherwise varying the process as described hereinafter.

The oligomeric compounds of formula XV are polyphenylene ether-derived bisphenols and their bishaloformate derivatives. They may be prepared by equilibration of a polyphenylene ether with a bisphenol of the formula

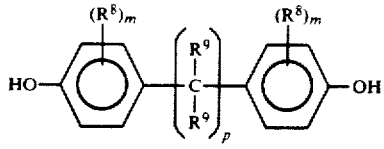

in the presence of a phenoxy radical which may be generated by a diphenoquinone. A bisphenol containing no more than about 5 polyphenylene ether units is desired, and it may be produced by employing a ratio of moles of bisphenol to units in the polyphenylene ether of at least about 0.1:1 and preferably about 0.1–1.0:1. This method of preparing polyphenylene ether-derived bisphenols is disclosed, for example, in U.S. Pat. No. 3,496,236, the disclosure of which is also incorporated by reference herein.

The molar ratio of the compound of formula XII to that of formula XIV is generally about 5–10:1, and preferably about 7–8:1. The concentration of the base solution is most desirably no higher than about 5 M.

In a preferred embodiment of the preparation method, the compounds of formulas XII and XIV, or a combination thereof with the amine, are added gradually to a mixture of the other materials. It is within the scope of this embodiment to incorporate the amine in the mixture to which said compounds are added, or to add it gradually, either in admixture with said compounds or separately. Continuous or incremental addition of amine is frequently preferred. The reaction temperature is preferably about 40°-50° C.

For maximization of the yield and purity of macrocyclic polyphenylene ether-polycarbonate oligomers, it is preferred to use up to about 0.7 mole and preferably about 0.1-0.6 mole of compounds of formulas XII and XIV per liter of organic liquid in the reaction system, including any liquid used to dissolve said compounds. The preferred molar ratio of amine to said compounds is about 0.05-1.5:1. and most often about 0.1-1.0:1. The molar ratio of base to said compounds is usually about 1-5:1.

Polyesters

The $A^5$ value in formula V may be a divalent aliphatic, alicyclic or aromatic radical. Suitable aromatic radicals are similar to $A^2$ and $A^3$, with the proviso that they are m- or p-linked. The alicyclic radicals are similarly linked and most often contain about 4-8 carbon atoms.

The $R^3$ may be considered as being derived from a dicarboxylic acid of the formula $R^3(COOH)_2$. Thus, suitable dicarboxylic acids include adipic, pimelic and cyclohexane-1,3-dicarboxylic acids and the unsubstituted and substituted terephthalic, isophthalic and pyridine-2,6-dicarboxylic acids. The unsubstituted aromatic acids, especially isophthalic and terephthalic and most especially isophthalic acid, are preferred.

The macrocyclic polyester oligomers generally comprise mixtures of oligomers, principally having degrees of polymerization up to about 7. The predominant oligomer is usually the trimer.

Such oligomers may be prepared by adding a dicarboxylic acid chloride of the formula $R^3(COCl)_2$ to a mixture of an organic liquid as described hereinabove and a salt of the spirobiindane bisphenol, the latter being maintained in low concentration. It is often preferred to employ a di-(alkali metal) salt in a mixed aqueous-organic medium. Also present is a catalyst comprising at least one tertiary amine or quaternary ammonium salt, generally in the amount of about 0.1-15.0 mole percent based on spirobiindane bisphenol.

For the preparation of macrocyclic copolyesters, there may also be employed at least one second salt of a dihydroxy compound of the formula HO—$R^1$—OH, where $R^1$ is as previously defined. Said second salt may be in the same vessel as the spirobiindane bisphenol salt or may be added concurrently with the dicarboxylic acid chloride, with the former method frequently affording somewhat higher yields of macrocyclic copolyesters.

Suitable tertiary amines include those previously described with reference to polycarbonates. In general, the quaternary ammonium salts are somewhat preferred over the tertiary amines. Illustrative quaternary ammonium salts are the tetraalkylammonium halides containing a total of about 15-30 carbon atoms, examples of which are tetra-n-butylammonium bromide and methyltrioctylammonium chloride.

The catalyst is preferably in admixture with said spirobiindane bisphenol salt. Reaction temperatures in the range of about 25°-100° C. and especially about 30°-50° C. are typical.

Anhydrous methods for preparing the macrocyclic polyester oligomers may also be employed. They typically utilize the same organic liquids as diluents and a trialkylammonium salt of the bisphenol.

In a preferred embodiment of the invention, the macrocyclic oligomers are polyamides, polyimides (including polyamideimides), polyetherketones or polyethersulfones. These compositions will now be described.

Polyamides

In the macrocyclic polyamide oligomers corresponding to formula VI, the $R^5$ values may be considered as derived from dicarboxylic acids of the formula $R^5(COOH)_2$, and may be substituted or unsubstituted alkylene or arylene (other than o-arylene) radicals. The alkylene radicals generally contain about 2-8 carbon atoms, about 2-4 thereof usually being in a straight chain. They are illustrated by ethylene, trimethylene and tetramethylene, as well as branched isomers thereof. The arylene radicals, which are preferred, generally contain about 6-25 carbon atoms and are illustrated by m-phenylene, p-phenylene, the corresponding tolylene radicals, 4,4'-biphenylene, 1,4-naphthylene, 1,8-naphthylene and divalent phenylindane radicals of the formula

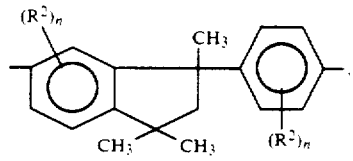

wherein $R^2$ and n are as previously defined. Spirobiindane radicals are also included. Any substituent which does not undergo interfering reactions in the context of this invention may be present thereon. Illustrative substituents are halo, nitro, hydroxy and alkoxy. The arylene hydrocarbon radicals, especially m-phenylene, are most preferred.

The $R^4$ radicals are most often unsubstituted m- or p-phenylene. The value of p may be 0 or 1; that is, the —O—$R^4$—moiety may be present or absent.

Polyamide oligomers corresponding to formula VII are also within the scope of the invention. In that formula, $A^4$ may be, for example, m-phenylene, p-phenylene or a disiloxane radical of formula VIII, wherein the disiloxane moiety is flanked by two alkylene, cycloalkylene or arylene radicals. Any $R^3$ alkylene radicals for this purpose generally contain 2-4 carbon atoms. The substituents on silicon may be alkyl, phenyl or substituted phenyl and are most often methyl.

The macrocyclic polyamide oligomer compositions of this invention include oligomers having degrees of polymerization from 1 to about 15. For the most part, said compositions are mixtures of oligomers having varying degrees of polymerization. However, it is frequently possible to isolate individual oligomers, particularly the cyclic "monomer", by conventional means such as preparative scale high pressure liquid chromatography. Higher oligomer species are hereinafter sometimes identified as "dimer", etc.

Said oligomer compositions may be prepared from the corresponding diamines and dicarboxylic acid chlorides, as described hereinafter. The diamines in which R4 is m- or p-phenylene and p is 1, and corresponding nitro compounds, are novel compounds; they are disclosed and claimed in the aforementioned application Ser. No. 20,264.

The nitro compounds (hereinafter sometimes "bisnitrophenoxy ethers") may be prepared by the reaction of halonitrobenzenes or dinitrobenzenes with spirobiindane bisphenol salts under alkaline conditions in a dipolar aprotic solvent. The molar ratio of nitro compound to spirobiindane bisphenol salt is generally about 2.0–2.5:1. The corresponding bis-aminophenoxy ethers may be prepared by reduction of said bis-nitrophenoxy ethers by conventional means such as catalytic hydrogenation.

The preparation of the bis-nitrophenoxy and bis-aminophenoxy ethers is illustrated by the following examples.

EXAMPLE 1

A reaction vessel fitted with a mechanical stirrer, reflux condenser and nitrogen purge means was charged with 45.9 grams (149 mmol.) of SBI, 49.31 grams (303 mmol.) of p-chloronitrobenzene, 61.68 grams (447 mmol.) of potassium carbonate and 700 ml. of dry dimethylformamide. The mixture was purged with nitrogen and heated at 150° C. with stirring for 14 hours. It was then poured into 1.5 liters of ice water with rapid stirring, and the precipitated 6,6'-bis(4-nitrophenoxy)-3,3,3', 3'-tetramethyl-1,1'-spiro(bis)indane was recrystallized from methyl ethyl ketone. The yield was 73.7 grams (90% of theoretical) of a crystalline product, m.p. 200.5°–201.5° C. The structure was confirmed by elemental analysis.

EXAMPLE 2

A mixture of 5.27 grams (9.58 mmol.) of the product of Example 1, 100 mg. of platinum oxide and 100 ml. of tetrahydrofuran was pressurized with hydrogen at 50 psi. and shaken for 3 hours at room temperature. The mixture was filtered, using a filter aid material, and the filtration residue was washed with methylene chloride. The combined filtrates were vacuum stripped to yield 4.6 grams (98% of theoretical) of 6,6'-(4-aminophenoxy)-3,3,3',3'-tetramethyl-1,1'-spiro(bis)indane, which was recrystallized from toluene to yield the pure product as fine crystals, m.p. 214°–215° C. The structure was confirmed by elemental analysis.

EXAMPLE 3

In a reaction vessel similar to that of Example 1, a mixture of 24.51 grams (79.6 mmol.) of SBI, 27.40 grams (163.1 mmol.) of m-dinitrobenzene, 43.93 grams (318.4 mmol.) of potassium carbonate and 175 ml. of dimethyl sulfoxide was heated for 30 hours at 140° C., under nitrogen. The mixture was cooled and diluted with 500 ml. of methylene chloride, and was washed with 10% aqueous sodium hydroxide solution, water and aqueous sodium chloride solution. The organic phase was filtered and the filtration residue was rinsed with methylene chloride. The combined filtrates were vacuum stripped to yield 42.5 grams of the product as a thick oil. A portion of the oil was purified by medium pressure liquid chromatography of an ethyl acetate-hexane solution over silica gel. The purified [6,6'-(3-nitrqphenoxy)-3,3,3'] *6,6,'-(3-nitrophenoxy)-3,3,3'*, 3'-tetramethyl-1,1'-spiro(bis)indane was obtained in 66% yield, m.p. 174°–175° C. The structure was confirmed by elemental analysis.

EXAMPLE 4

Following the procedure of Example 2, 2.5 grams (4.5 mmol.) of the product of Example 3 was hydrogenated over a platinum oxide catalyst. Upon solvent removal and recrystallization from a toluene-cyclohexane mixture, there was obtained 1.8 grams (80% of theoretical) of analytically pure 6,6'-(3-aminophenoxy)-3,3,3',3'-tetramethyl-1,1'-spiro(bis)indane, m.p. 190°–197° C. with decomposition. The structure was confirmed by elemental analysis.

The macrocyclic polyamide oligomer compositions may be prepared by gradually adding the dicarboxylic acid chloride to a solution in a substantially inert organic liquid of the diamine, at a temperature effective to achieve reaction, said acid chloride and diamine being employed in a molar ratio in the range of about 0.8–1.25:1.

Among the suitable intermediates for the polyamide oligomers are the 6,6'-diamino- and 6,6'-dicarboxy-3,3,3',3'-tetramethyl-bis-1,1'-spiroindanes. Said compounds are known in the art and may be prepared, for example, by oxidation of the corresponding 6,6'-dimethyl compounds to dicarboxylic acids followed, for diamine preparation, by treatment with sodium azide and sulfuric acid (i.e., the Schmidt reaction), as described in Curtis et al., J. Chem. Soc., 1962, 418–421.

Any organic liquid which is substantially inert to the diamines and acid chlorides employed may be used in the preparation of the oligomer compositions. In the case of aromatic diamines, suitable liquids include halogenated alkanes such as methylene chloride and chloroform; aprotic polar solvents such as dimethylformamide, dimethylacetamide and dimethyl sulfoxide; aromatic hydrocarbons and chlorinated aromatic hydrocarbons such as toluene, xylene and chlorobenzene; and ethers such as tetrahydrofuran and ethylene glycol dimethyl ether. In most instances, relatively volatile solvents such as methylene chloride, chloroform and tetrahydrofuran are preferred by reason of the ease of removal thereof by evaporation following completion of the reaction.

In this process of preparation, the acid chloride is gradually added to a solution of the diamine in the organic liquid. It is also most often added in the form of a solution in said liquid. The reagents are employed in molar ratios in the range of about 0.8–1.25:1 and preferably about 0.95–1.05:1.

In one embodiment of the invention, the diamine is initially present in the reaction vessel. Its concentration should then be up to about 0.03 M to optimize the yield of cyclics. A second embodiment is to introduce both reagents simultaneously to said organic liquid, whereupon the diamine is ordinarily also added as a solution.

It is sometimes advantageous to employ a hydrogen chloride acceptor in the reaction. Suitable hydrogen chloride acceptors are moderately strong bases such as alkali metal carbonates and tertiary amines, preferably sodium carbonate, triethylamine and pyridine. Said acceptor is generally present with the diamine, being either in the reaction vessel originally or introduced simultaneously with the acid chloride. The proportion thereof is preferably at least stoichiometric, most often about 1–3 equivalents per calculated equivalent of hydrogen chloride evolved.

Any reaction temperature effective to achieve reaction of the diamine with the dicarboxylic acid chloride may be employed. Elevated temperatures, such as in the range of about 35°-100° C., are usually satisfactory, with about 40°-80° C. being preferred.

The above-described macrocyclic polyamide oligomer compositions may also contain linear oligomers and high polymer (i.e., linear polyamides having a degree of polymerization greater than about 20). Any high polymer can typically be removed by conventional means such as flash chromatography on silica gel. When employing isophthaloyl dichloride and the bis-aminophenoxy ethers of this invention, cyclics yields of 90% or greater are typical.

Polyimides and Polyamideimides

In the polyimides corresponding to formula IX, the $Z^2$ value may be any of the specified linking groups, including those containing a Q value which may be, for example, m- or p-phenylene, a radical derived from bisphenol A or a spirobiindane radical. Polyimides in which $Z^2$ or $Z^3$ contain amide moieties are, of course, polyamideimides. By reason of their facile polymerization, the preferred macrocyclic polyimides are the polyamideimides, those of formula IX in which $Z^2$ is sulfur or a disiloxane moiety, and those of formula X in which $Z^3$ has formula VIII.

The macrocyclic polyimide oligomers may be prepared by reacting an appropriate diamine with an appropriate tetracarboxylic acid or functional derivative thereof. Suitable functional derivatives include dianhydrides and bisimides containing electron-deficient N-substituents; the latter are disclosed in U.S. Pat. No. 4,578,470, the disclosure of which is incorporated by reference herein. The dianhydrides are preferred. Frequent reference to said dianhydrides will be made hereinafter, but it should be understood that the free acids and other appropriate functional derivatives may be substituted therefor.

The spirobiindane diamines and tetracarboxylic acids and their derivatives are particularly susceptible to formation of cyclic products upon reaction with dianhydrides. Therefore, it is not generally necessary to employ high dilution or other unusual reaction conditions for the preparation of the compositions of this invention. For the most part, approximately equimolar proportions of diamine and dianhydride are heated at a temperature in the range of about 120°-250° C., with water of reaction being removed by distillation. It is frequently preferred to employ a relatively high boiling organic solvent, typically a chlorinated aromatic hydrocarbon such as o-dichlorobenzene or a dipolar aprotic solvent such as dimethyl sulfoxide or dimethylacetamide. The presence of a metal carboxylate or oxygenated phosphorus compound as a catalyst, in accordance with U.S. Pat. Nos. 4,293,683 and 4,324,882, is also often beneficial. The disclosures of these patents are also incorporated by reference herein.

Tetracarboxylic acids of the formula

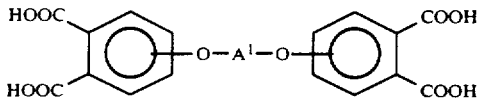

and their functional derivatives are novel compounds and are disclosed and claimed in copending, commonly owned application Ser. No.146,153 filed Jan. 20, 1988. The bisimides may be prepared by the reaction of the corresponding spirobiindane bisphenols with nitro-N-alkylphthalimides and converted to dianhydrides by methods similar to those employed to prepare the corresponding bisphenol A reaction products. The following example is illustrative.

EXMAPLE 5

SBI, 15.4 grams (50 mmol.), was added portionwise to a slurry of 262 grams (102 mmol.) of sodium hydride in 100 ml. of dry dimethylformamide. The mixture was heated for one hour at 75° C in a nitrogen atmosphere, after which 20.6 grams (100 mmol.) of 4-nitro-N -methylphthalimide was added. The resulting mixture was heated for 1½ hours at 110° C., cooled and poured into 3 volumes of cold water. The solid which precipitated was filtered and suspended in a mixture of toluene and 2% aqueous sodium hydroxide solution and the mixture was cooled and filtered; the organic phase of the filtrate was dried and vacuum stripped. The combined solids were the desired 6,6'-bis(3,4-dicarboxyphenoxy) -3,3,3',3'-tetramethylspiro(bis)indane bis-N-methylimide (27.07 grams, 86.5% of theoretical). Its melting point after recrystallization from toluene was 217.5°-218° C. The structure was confirmed by proton nuclear magnetic resonance and field desorption mass spectrometry.

A solution of 14 grams (22.36 mmol.) of the bisimide in 16.7 grams of a 45% aqueous potassium hydroxide solution and 20 ml. of water was heated under reflux, with water and methylamine being removed by distillation and water being replenished. Heating was continued for 4 days, until the distillate was neutral to pH paper. The solution was cooled and added slowly to cold concentrated hydrochloric acid, and the tetracarboxylic acid which precipitated was collected by filtration, dried and dissolved in a mixture of 25 ml. of chlorobenzene and 5 ml. of acetic anhydride. Upon heating under reflux for 2½ hours and cooling, the desired dianhydride (10.3 grams, 77% of theoretical) precipitated and was filtered and dried; it melted at 233°-234° C. The structure was confirmed spectroscopically as for the bisimide.

Polyamideimides may be prepared by methods similar to those employed for the preparation of polyimides, employing a tricarboxylic acid or functional derivative thereof instead of the tetracarboxylic acid or a diamine containing an amide moiety. The tricarboxylic acid, when used (and the corresponding $R^9$ radical), may be aliphatic, alicyclic or aromatic and is preferably aromatic. An especially preferred acid derivative is trimellitic anhydride acid chloride (TAAC).

Polyetherketones and Polyethersulfones

In the compounds corresponding to formula XI, the $A^5$ radical may be any aromatic radical which contains at least one carbonyl or sulfone group. Illustrative radicals of this kind are bis(4-phenylene)sulfone, the corresponding radical derived from benzophenone and the 1,8-divalent 9,10-anthraquinone radical.

The macrocyclic polyetherketone and polyethersulfone oligomers may be prepared by the reaction of a spirobiindane bisphenol with a corresponding dihalo (preferably difluoro or dichloro) ketone or sulfone in the presence of a basic reagent such as potassium carbonate, which promotes the requisite nucleophilic aromatic substitution reaction. A relatively high boiling dipolar aprotic solvent such as dimethyl sulfoxide is preferred, and suitable reaction temperatures are generally in the range of about 120°-180° C. Molar ratios of spirobiindane bisphenol to dihalo compound are generally 1:1 or very close thereto, and the amount of base is most often about 2.0–2.5 moles per mole of spirobiindane bisphenol.

The preparation of the macrocyclic oligomer compositions of this invention is illustrated by the following examples.

EXAMPLE 6

A mixture of 31.7 grams (100 mmol.) of spirobiindane bisphenol, 30 grams (200 mmol.) of N,N-diethylaniline and 500 ml. of methylene chloride was cooled to −10° C. with stirring. Phosgene was bubbled through the solution at 3 grams per minute for 10 minutes (total 300 mmol.). Stirring was continued as the mixture was allowed to warm slowly to room temperature over 2 hours. It was warmed in a water bath and sparged with nitrogen to evaporate about half the methylene chloride, diluted with an equal volume of hexane and washed three times with dilute aqueous hydrochloric acid and once with water. The organic layer was filtered and vacuum stripped, and the resulting oil was dissolved in petroleum ether and filtered. Upon stripping of the petroleum ether, the desired spirobiindane bisphenol bischloroformate was obtained; it comprised about 90% monomer bischloroformate.

A mixture of 80 ml. of methylene chloride, 10 ml. of water, 0.5 ml. of 50% aqueous sodium hydroxide and 0.51 ml. of triethylamine was heated to reflux with stirring. There was added over 30 minutes, with continued stirring, 50 ml. of a 1 M solution in methylene chloride of equimolar proportions of bisphenol A bischloroformate and spirobiindane bisphenol bischloroformate. At the same time, 5 ml. of 50% aqueous sodium hydroxide and 0.525 ml. of triethylamine were added in 5 increments at 5-minute intervals. When the addition was complete, the organic and aqueous layers were separated and the aqueous layer was washed with methylene chloride. The combined organic phases were washed three times with dilute aqueous hydrochloric acid and once with water, filtered and vacuum stripped to yield the desired mixed macrocyclic polycarbonate oligomers.

EXAMPLE 7-11

Following the procedure of Example 6, macrocyclic bisphenol A-SBI copolycarbonate oligomer compositions having the following proportions were prepared:

| Example | SBI, mole % | Bisphenol A, mole % |
|---|---|---|
| 7 | 75 | 25 |
| 8 | 65 | 35 |
| 9 | 35 | 65 |
| 10 | 25 | 75 |
| 11 | 10 | 90 |

In Examples 7–10, reagent A was a mixture of the bischloroformates of SBI and bisphenol A; in Example 11, it was a mixture of bisphenol A bischloroformate and free SBI.

EXAMPLE 12

Phosgene was passed at 1 gram per minute into a mixture of 15.85 grams (50 mmol.) of spirobiindane bisphenol, 10 ml. of 2.5 M aqueous sodium hydroxide and 100 ml. of methylene chloride until a clear solution was obtained, at which point the pH dropped below 7. Phosgene passage was continued for a total of 12 minutes at a pH in the range of 4–6. The crude spirobiindane bisphenol bischloroformate composition was isolated as in Example 6; it was found to contain about 45% monomer bischloroformate, about 28% dimer bischloroformate and about 15% trimer bischloroformate.

Following the procedure of Example 6, a macrocyclic spirobiindane bisphenol homopolycarbonate mixture was prepared from the crude bischloroformate.

EXAMPLE 13

A three-necked, 50 ml. Morton flask equipped with a reflux condenser, mechanical stirrer and septum cap was charged with 11 ml. of methylene chloride, 2 ml. of water, 48 microliters of triethylamine and 0.15 ml. of 4 M aqueous sodium hydroxide solution. The mixture was heated to 45° C., with mechanical stirring at a rate just sufficient to disperse the water in the methylene chloride. There were then added simultaneously, via four syringes, a solution of 1.04 grams of SBI bischloroformate in 5 ml. of methylene chloride, a solution of 110 mg. of 2-(4-hydroxyphenyl)-2-4-(3,5-dimethyl-4-hydroxyphenoxy)phenyl]propane (prepared, for example, as described in Example 9 of U.S. Pat. No. 3,496,236) in 2 ml. of methylene chloride, a solution of 25 microliters of triethylamine in 75 microliters of methylene chloride, and 1.35 ml. of the aqueous sodium hydroxide solution. One-tenth of the contents of each syringe was charged to the reaction vessel every 3 minutes, for a total addition time of 30 minutes. There were thus provided, per mole of SBI bischloroformate: 130 mmol. of bisphenol, 440 mmol. of triethylamine and 5 moles of sodium hydroxide.

The mixture was stirred for an additional 3 minutes and diluted with 100 ml. of methylene chloride. The organic phase was washed twice with aqueous hydrochloric acid solution and once with aqueous sodium chloride solution, filtered through phase separation paper and vacuum stripped. The product which separated as a white flaky solid was shown by high pressure liquid chromatography to comprise 25% high polymer, about 36% cyclic SBI homopolycarbonate and about 36% mixed macrocyclic polycarbonate oligomers. Upon analysis by field desorption mass spectroscopy, the following oligomers were detected:

| Formula IV units | Formula XIV units |
|---|---|
| 1 | 1 |
| 2 | 1 |
| 3 | 1 |
| 4 | 1 |
| 2 | 3 |
| 3 | 2 |

No linear oligomers were found.

EXAMPLE 14

A solution of 18.22 grams of poly(2,6-dimethyl -1,4-phenylene ether) having a number average molecular weight of 20,000 as determined by gel permeation chromatography, 6.92 grams of bisphenol A and 200 ml. of toluene was heated to 120° C., with stirring, as 420 milligrams of 3,3'5,5'-tetramethyl-4,4'-diphenylquinone was added in three equal portions at 1-hour intervals. The mixture was heated for an additional 4 hours and vacuum stripped. The residue was dissolved in 200 ml. of methylene chloride and refrigerated at 3° C., whereupon unreacted polyphenylene ether precipitated as the methylene chloride complex.

The filtrate was vacuum stripped to afford 23.3 grams of a yellow solid shown by field desorption mass spectroscopy to comprise oligomers of formula XV wherein each $Y^3$ is hydrogen. A major proportion of the compounds detected had a value for x of less then 16, with said value in a large proportion being less than 5.

A reaction vessel identical to that of Example 13 was charged with 10 ml. of methylene chloride, 1.5 ml. of water, 0.16 ml. of aqueous sodium hydroxide solution and 51 microliters of triethylamine. Following the procedure of Example 1, there were then added a solution of 1.09 grams of SBI bischloroformate in 4 ml. of methylene chloride, a solution of 290 mg. of the above-prepared oligomer composition in 2 ml. of methylene chloride, a solution of 26 microliters of triethylamine in 74 microliters of methylene chloride and 1.4 ml. of aqueous sodium hydroxide solution. There were thus provided, per mole of SBI bischloroformate: 130 mmol. of bisphenol, 440 mmol. of triethylamine and 5 moles of sodium hydroxide.

Upon workup and isolation as described in Example 13, there was obtained 1.2 grams of a flaky solid which was shown by high pressure liquid chromatography to comprise 40% high polymer, about 30% macrocyclic SBI homopolycarbonate oligomers and about 30% mixed macrocyclic oligomers. The latter were shown by field desorption mass spectrometry to include molecular species containing one unit of formula XIV and the following other structural details:

| Formula IV units | x |
|---|---|
| 1 | 2 |
| 2 | 1 |
| 2 | 3 |

No linear oligomers were detected.

EXAMPLE 15

A mixture of 31.7 grams (100 mmol.) of SBI hemihydrate, 50 ml. of 5 M aqueous sodium hydroxide solution (250 mmol.), 645 mg. (2 mmol.) etra-n-butylammonium bromide and 200 ml. of methylene chloride was heated under reflux and 100 ml. of a 1 M solution of isophthaloyl chloride in methylene chloride was added over 30 minutes. After the addition was complete, refluxing was continued for 5 minutes. The aqueous and organic phases were separated and the aqueous phase was extracted with methylene chloride; the extracts were combined with the organic phase and washed with aqueous hydrochloric acid solution, aqueous sodium chloride solution and water. Upon evaporation of the methylene chloride, there was obtained a product which was found by high pressure liquid chromatographic analysis to contain 85% macrocyclic polyarylate oligomers and 15% linear polymer. The identities of the oligomers were confirmed by infrared and nuclear magnetic resonance spectroscopy.

EXAMPLE 16

The procedure of Example 15 was repeated, substituting terephthaloyl chloride on an equimolar basis for the isophthaloyl chloride. A product was obtained which comprised 50% macrocyclic polyarylate oligomers and 50% linear polyarylate.

EXAMPLE 17

To a mixture of 310 mg. (2.5 mmol.) of 4-dimethylaminopyridine in 50 ml. of methylene chloride was added under reflux over 30 minutes, with stirring, 25 ml. of a methylene chloride solution 1 M in SBI and 2.2 M in triethylamine, and 25 ml. of a 1 M solution of isophthaloyl chloride in methylene chloride. There were then added an excess of 1 M aqueous hydrochloric acid solution and additional methylene chloride. The organic phase was washed with water, concentrated, dissolved in chloroform and analyzed by gel permeation chromatography; it was found to contain 70% of the theoretical amount of macrocyclic SBI polyarylate oligomers.

EXAMPLE 18

A solution of 20.3 grams (10 mmol.) of isophthaloyl chloride in 10 ml. of methylene chloride was added over 30 minutes, with stirring, to a mixture of 2.01 grams (8.8 mmol.) of bisphenol A, 680 mg. (2.2 mmol.) of SBI, 880 mg. (22 mmol.) of sodium hydroxide, 32 mg. of tetra-n -butylammonium bromide, 20 ml. of methylene chloride and 5 ml. of water. Upon workup as described in Example 15, there was obtained a product which was found by gel permeation chromatography to contain about 55% macrocyclic copolyarylate oligomers.

EXAMPLE 19

To a mixture of 680 mg. (2.2 mmol.) of SBI, 180 mg. (4.4 mmol.) of sodium hydroxide, 32 mg. of tetra-n-butylammonium bromide, 10 ml. of methylene chloride and 2 ml. of water were added over 30 minutes, with stirring, 17.6 ml. (8.8 mmol.) of a 0.5 M aqueous solution of bisphenol A disodium salt and 10 ml. (10 mmol.) of a 1 M solution of isophthaloyl chloride in methylene chloride. Upon workup as described in Example 15, there was obtained a product which was shown by gel permeation chromatography to contain about 40% macrocyclic copolyarylate oligomers.

EXAMPLE 20

A reaction vessel fitted with a septum cap, a reflux condenser and nitrogen purge means was charged with 5 ml. of chloroform which was brought to reflux in a nitrogen atmosphere. There were simultaneously added over ½ hour, via two syringes, a solution of 505.4 mg. (1.03 mmol.) of the diamine of Example 2 and 213 mg. (2.11 mmol.) of triethylamine in 5 ml. of dry tetrahydrofuran, and a solution of 209 mg. (1.03 mmol.) of isophthaloyl chloride in 5 ml. of dry chloroform. Refluxing was continued for 5 minutes, after which the mixture was diluted with 50 ml. of chloroform, washed with dilute aqueous hydrochloric acid solution and with sodium chloride solution, filtered through phase separation paper and vacuum stripped, yielding 520 mg. (80% of theoretical) of the desired cyclic polyamide oligomer mixture, m.p. 245°-285° C. It was shown by high pressure liquid chromatography to contain macrocyclic oligomers with degrees of polymerization up to about 15, with monomer to hexamer species being present in the approximate ratios 78:28:8:4:2:1. The presence of the monomer and dimer was confirmed by field desorption mass spectrometry.

The cyclic monomer species was isolated by preparative scale high pressure liquid chromatography. Its identity was also confirmed by field desorption mass spectrometry.

EXAMPLE 21

A reaction system similar to that of Example 20 was charged with 62 ml. of chloroform which was brought to reflux in a nitrogen atmosphere. There were simultaneously added over 40 minutes a solution of 1 gram (2.04 mmol.) of the diamine of Example 4 and 490 mg. (4.85 mmol.) of triethylamine in 10 ml. of dry tetrahydrofuran, and a solution of 500 mg. (3.46 mmol.) of isophthaloyl chloride in 10 ml. of dry chloroform. Refluxing was continued for 15 minutes, after which the mixture was diluted with methylene chloride, washed with dilute aqueous hydrochloric acid solution and vacuum stripped, yielding 1.33 grams of the desired macrocyclic polyamide oligomer mixture. It was shown by high pressure liquid chromatography to contain monomer to heptamer species in the approximate ratios 18.9:5.6:1.2:1.6:1.3:0.9:1.

EXAMPLE 22

A solution of 1 gram (2 mmol.) of the diamine of Example 2 and 410 mg. (4 mmol.) of triethylamine in 36 ml. of dry tetrahydrofuran was heated to reflux and a solution of 410 mg. (2 mmol.) of isophthaloyl chloride in 5 ml. of chloroform was added over ½ hour. Upon workup as in Example 20, there was obtained a product shown by high pressure liquid chromatography to contain over 90% macrocyclic polyamide oligomers, with monomer to octamer species being present in the approximate ratios 18.4:7.9:4.5:2.9:2.0:1.6:1.2:1.

EXAMPLE 23

Following the procedure of Example 22, a solution of 2 mmol. of isophthaloyl chloride in 5 ml. of chloroform was added to a mixture of 2 mmol. of the diamine of Example 2, 650 mg. (6 mmol.) of sodium carbonate and 200 ml. of dry chloroform. Upon workup, there was obtained 1.2 grams of a tan solid containing about 90% macrocyclics, with monomer to hexamer species being present in the approximate ratios 11.0:3.6:2.3:1.4:1.2:1.

EXAMPLE 24

Following the procedure of Example 22, a solution of 2 mmol. of isophthaloyl chloride in 5 ml. of chloroform was added to a solution of 2 mmol. of the diamine of Example 2 in 77 ml. of dry chloroform, in the absence of hydrogen chloride acceptors. There was obtained 900 mg. of a yellow solid containing 90% macrocyclics, with monomer to hexamer species being present in the approximate ratios 16.2:3.1:1.7:1.0:1.1:1.

EXAMPLES 25–26

The procedure of Example 22 was repeated substituting 4,4'-biphenyldicarboxylic acid chloride and 1,1,3-trimethyl-3-phenylindane-4',6-dicarboxylic acid chloride, respectively, for isophthaloyl chloride on an equimolar basis. The products were shown to contain the following approximate ratios of molecular species:

Example 25—monomer to decamer,
7.4:7.3:4.4:3.1:2.3:2.1:1.6:1.4:1.2:1.

Example 26—monomer to heptamer,
[4.45.211.3:6.33.3:1.7:1] *4.4:5.2:11.3:6.3:3.3:1.7:1.*

EXAMPLE 27

To a reaction vessel containing 12 ml. of dry methylene chloride at reflux temperature were added over ½ hour under nitrogen, with stirring, a solution of 200 mg. hydroxide (0.65 mmol.) of 6,6'-diamino-3,3,3', 3'-tetramethyl-1,1'-spiroindane and 132 mg. (1.3 mmol.) of triethylamine in 4 ml. of methylene chloride, and a solution of 133 mg. (0.65 mmol.) of isophthaloyl chloride in 4 ml. of methylene chloride. The mixture was cooled to room temperature, diluted with 50 ml. of methylene chloride, washed twice with dilute aqueous hydrochloric acid solution and once with aqueous sodium chloride solution, dried over magnesium sulfate and vacuum stripped. There was obtained 270 mg. of a white solid which was shown by high pressure liquid chromatography and field desorption mass spectroscopy to contain approximately 50% macrocyclic polyamide oligomers, with the balance being linear oligomers and high polymer.

EXAMPLE 28

A reaction vessel fitted with a septum cap, a magnetic stirrer, a reflux condenser and nitrogen purge means was charged with a solution of 840 mg. (1.71 mmol.) of the diamine of Example 2 and 270 mg. (3.42 mmol.) of pyridine in 20 ml. of chloroform which was brought to reflux in a nitrogen atmosphere. There was added over one hour, via a syringe, a solution of 1 gram (1.71 mmol.) of the diacid chloride of 6,6'-dicarboxy-3,3,3',3'-tetramethyl-1,1'-spiro(bis)indane in 14 ml. of dry chloroform. Refluxing was continued for 15 minutes, after which the mixture was diluted with 100 ml. of chloroform, washed with dilute aqueous hydrochloric acid solution and with sodium chloride solution, dried over magnesium sulfate, filtered and vacuum stripped, yielding 850 mg. of the desired macrocyclic polyamide oligomer mixture.

EXAMPLES 29–31

Following the procedure of Example 21, various diamines were reacted with equimolar proportions of the diacid chloride of 6,6'-dicarboxy-3,3,3',3'-tetramethyl- 1,1'-spiro(bis)indane. After washing, the organic phases were dried over magnesium sulfate, filtered and vacuum stripped. The products were shown by high pressure liquid chromatography and field desorption mass spectrometry to comprise macrocyclic amide oligomers having degrees of polymerization from 1 to 3. The diamines employed were:

Example 29—m-phenylenediamine;
Example 30—4-aminophenyl ether;
Example 31—2.2-bis(4-aminophenyl)propane.

EXAMPLE 32

To a solution of 1.081 grams (10 mmol.) of mphenylenediamine and 18 mg. of sodium phenylphosphonate in 120 ml. of o-dichlorobenzene was added slowly at 130° C., with stirring, a solution of 6 grams (10 mmol.) of the dianhydride of Example 5 in 60 ml. of hot o-dichlorobenzene. Heating at 130° C. was continued for 1½ hours, after which the temperature was raised to 225° C. and water and solvent were removed by distillation to a total of 90 ml. The solution was heated under reflux for 3 hours, cooled and poured into 600 ml. of methanol. The solids which precipitated were extracted in a Soxhlet extractor with acetone for 18 hours. The residue from the extraction was a linear polyimide having a weight average molecular weight greater than 100,000. Upon evaporation of the acetone from the extracts, there was obtained a white powder which was shown by field desorption mass spectrometry to comprise principally the macrocyclic polyetherimide dimer. The yield was about 75% of theoretical.

EXAMPLES 33-36

The procedure of Example 32 was repeated, substituting the following diamines for the m-phenylenediamine on an equimolar basis:

Example 33—p-phenylenediamine;
Example 34—bis(4-aminophenyl)methane;
Example 35—4-aminophenyl ether;
Example 36—9,9,bis(4-aminophenyl)fluorene.

The product of Example 33 was insoluble in methanol and comprised a mixture of linear polyetherimide and macrocyclic oligomers.

EXAMPLE 37

A dry blend of 652 mg. (2 mmol.) of bis(3,4-dicarboxyphenyl) sulfide dianhydride, 1043 mg. (2 mmol.) of BPADA, 1960 mg. (4 mmol.) of the diamine of Example 2 and 40 mg. of sodium phenylphosphonate was added over 45 minutes, with stirring, to 120 ml. of o-dichlorobenzene maintained at 140° C. The resulting solution was distilled slowly with removal of 60 ml. of distillate, including water of reaction. It was then heated under reflux for 3 hours, after which the solution was concentrated to about 20-25 ml. by distillation, cooled, poured into an excess of methanol and agitated in a blender. Upon filtration and drying of the residue in a vacuum oven, there was obtained 2.76 grams (79% of theoretical) of a solid product which was shown by liquid chromatographic analysis to be a mixture of macrocyclic polyimides and linear polymer comprising about 80% cyclics.

One gram of the crude product was extracted for 24 hours with acetone in a Soxhlet extractor. Upon precipitation from the acetone extract, there was obtained 300 mg. of a mixture of macrocyclic polyimides substantially free of linear polymer. It was shown by field desorption mass spectroscopy to contain the macrocyclic "monomer" containing one unit of formula IX, the corresponding "monomer" of the diamine and BPADA, the macrocyclic "dimer" of the diamine and bis(3,4-dicarboxyphenyl) sulfide and the mixed "dimer". The residue from the extraction, comprising linear polyimide, had a glass transition temperature of 233° C.

EXAMPLE 38

A mixture of 1.956 grams (6 mmol.) of bis(2,3-dicarboxyphenyl) sulfide, 2.94 grams (6 mmol.) of the diamine of Example 2 and 60 mg. of sodium phenylphosphonate was added to o-dichlorobenzene and treated as in Example 37. The solid product (4.62 grams, or 98.7% of theoretical) was shown by liquid chromatographic analysis to comprise 80% cyclics. Upon extraction by acetone, 950 mg. of cyclics substantially free of linear polymer was obtained; field desorption mass spectroscopy showed the presence of the macrocyclic monomer and dimer. The residue from the extraction, comprising linear polyimides, had a glass transition temperature of 250.2° C.

EXAMPLE 39

A dry blend of 100 mg. (0.33 mmol.) of 6,6'-di-amino-3,3,3',3'-tetramethyl-1,1'-spiro(bis) indane and 107 mg. (0.33 mmol.) of bis(2,3-dicarboxyphenyl) sulfide dianhydride is added over 30 minutes, with stirring, to a mixture of 20 ml. of o-dichlorobenzene and 1 mg. of sodium phenylphosphonate maintained at 100° C. The mixture is maintained at that temperature for 2 hours and then distilled until 5-7 ml. of distillate, including water of reaction, has been collected. It is then heated under reflux for 5 hours. Upon workup and extraction as in Example 37, the desired macrocyclic product is obtained.

EXAMPLE 40

To a solution of 1.03 grams (4.54 mmol.) of 3,3'-diaminobenzanilide and 15 mg. of sodium pyrophosphate in 280 ml. of o-dichlorobenzene was added under reflux over ½ hour, with stirring, a solution of 2.72 grams (4.54 mmol.) of the dianhydride of Example 5 in 30 ml. of warm o-dichlorobenzene. Refluxing was continued for 2 hours, after which the water and solvent were removed by distillation to a total of 180 ml. The solution was cooled and poured into 500 ml. of rapidly stirred methanol. The solids which precipitated were extracted in a Soxhlet extractor with acetone. The residue from the extraction was a linear polyamideimide. Upon evaporation of the acetone from the extracts, there was obtained a white powder which was shown by field desorption mass spectrometry to comprise principally the macrocyclic polyamideimide dimer. The yield was about 70% of theoretical.

EXAMPLE 41

To a solution of 1 gram (2.04 mmol.) of trimellitic anhydride acid chloride and 15 mg. of sodium pyrophosphate in 2 ml. of o-dichlorobenzene was added slowly at 100° C., with stirring, a solution of 430 mg. (2.04 mmol.) of the diamine of Example 2 in 1 ml. of o-dichlorobenzene. The mixture was heated at 180° C. for 1 hour and 5 ml. of o-dichlorobenzene was added. Water and solvent were removed by distillation to a total of 50 ml., after which o-dichlorobenzene addition and distillation were repeated. The solution was cooled and poured into 50 ml. of rapidly stirred methanol. The solids which precipitated were filtered to yield 1.2 grams (91% of theoretical) of a material which was shown by high pressure liquid chromatography and field desorption mass spectrometry to comprise principally the macrocyclic polyamideimide dimer.

EXAMPLE 42

A solution of 1.274 grams (5 mmol.) of 1,9-di-amino-4,4,6,6-tetramethyl-4,6-disila-5-oxanonane in 50 ml. of o-dichlorobenzene was added over 1 hour to a solution of 3 grams (5 mmol.) of the dianhydride of Example 5 and 2 mg. of sodium phenylphosphonate in 250 ml. of o-dichlorobenzene, at 140° C. When the addition was completed, the temperature was raised to 225° C. and o-dichlorobenzene and water were removed by distillation until the distillate was no longer cloudy; a total of about 100 ml. of o-dichlorobenzene was thus removed. The residual solution was heated under reflux for 2 hours and then reduced to about 10% of its original volume by distillation. Upon cooling and pouring into 5 volumes of methanol, a solid precipitated which was collected by filtration and dried in a vacuum oven at 110° C. It was shown by field desorption mass spectrometry to comprise the desired macrocyclic siloxane polyetherimide monomer and dimer. A further portion of macrocyclic monomer was obtained by evaporation of the methanol from the filtrate. The total yield of macrocyclic oligomers was 3.34 grams, or 82% of theoretical.

EXAMPLE 43

The procedure of Example 42 was repeated, replacing the diamine on an equimolar basis with bis(3-aminophenyl)tetramethyldisiloxane. There was obtained 3.87 grams (85% of theoretical) of a white solid comprising a mixture of linear siloxane polyetherimide and macrocyclic oligomers.

EXAMPLE 44

A solution of 11 grams (22 mmol.) of the diamine of Example 2 and 10 mg. of sodium pyrophosphate in 1000 ml. of o-dichlorobenzene was heated under reflux, with stirring, and a solution of 9.42 grams (22 mmol.) of 1,3-bis(3,4-dicarboxyphenyl)tetramethyldisiloxane dianhydride in 120 ml. of o-dichlorobenzene was added over ½ hour. The mixture was heated under reflux for 2 hours, after which about 200 ml. of solvent was removed by distillation and refluxing was continued for another 3 hours. The solution was concentrated by distillation to about 200 ml., cooled and added to 1 liter of hexane, with stirring. A solid product precipitated and was collected by filtration and air-dried. The yield was 18.5 grams, or 94% of theoretical. It was shown by high pressure liquid chromatography and field desorption mass spectrometry to include 90% macrocyclic siloxane polyetherimide oligomers having degrees of polymerization from 1 to 5, and 10% linear siloxane polyetherimide. Upon recrystallization from o-dichlorobenzene, there was obtained substantially pure macrocyclic monomer melting at 295°-299° C.

EXAMPLE 45

To a mixture of 100 ml. of dimethyl sulfoxide, 50 ml. of toluene and 2.073 grams (20.9 mmol.) of potassium carbonate were added under nitrogen, with stirring, 2.543 grams (10 mmol.) of bis(4-fluorophenyl) sulfone and 3.084 grams (10 mmol.) of SBI. The mixture was heated at 140°-150° C. for 4 hours, cooled and poured into 400 ml. of methanol, whereupon the desired macrocyclic polyethersulfone oligomers precipitated as a white solid which was filtered and dried for 3 hours in a vacuum oven at 100° C. The yield was 4.73 grams (90% of theoretical).

EXAMPLES 46-49

The procedure of Example 45 was repeated, substituting other haloaryl compounds for the bis(4-fluorophenyl)sulfone. The compounds employed and yields of macrocyclic oligomers obtained were as follows:
Example 46—4,4'-difluorobenzophenone, 47%;
Example 47—4-(4-fluorobenzoyl)phenyl ether, 40%;
Example 48—4-(4-fluorobenzoyl)phenyl sulfide, 48%;
Example 49—1,8-dichloro-9,10-anthraquinone, 52%.

EXAMPLE 50

A reaction vessel fitted with a thermometer, septum cap and Dean-Stark trap fitted with a condenser was charged with 100 ml. of dimethyl sulfoxide, 50 ml. of toluene and 2.073 grams (20.9 mmol.) of finely ground potassium carbonate. A solution of 3.084 grams (10 mmol.) of SBI and 2.543 grams (10 mmol.) of bis(4-fluorophenyl) sulfone in 12 ml. of dimethyl sulfoxide was added at 140°-150° C., with stirring, over 2½ hours. Heating was continued for 3 hours after which the toluene was removed by distillation and the mixture was cooled to room temperature and poured into 400 ml. of methanol. The product, comprising macrocyclic polyethersulfone oligomers, was separated by filtration and dried in a vacuum oven at 100° C. The yield was 4.073 grams (78% of theoretical). Field desorption mass spectrometric analysis showed the presence of the macrocyclic polyethersulfone dimer and trimer.

EXAMPLES 51-52

The procedure of Example 50 was repeated, substituting bisphenol A and 4,4'-dihydroxybiphenyl on an equimolar basis for half the SBI. The yields of macrocyclic oligomers were 76% and 65%, respectively, of theoretical.

The macrocyclic oligomers of this invention may be converted to corresponding linear polymers, which have uses typical of known polymers of these types. The method of conversion to linear polymers will depend on the linking groups present in the macrocyclic oligomers.

Macrocyclic polycarbonate oligomers may be converted to linear polycarbonates by treatment with a polycarbonate formation catalyst. Suitable catalysts include various bases and Lewis acids. It is known that basic catalysts may be used to prepare polycarbonates by the interfacial method, as well as by transesterification and from cyclic oligomers. Such catalysts may also be used to polymerize the cyclic oligomer mixtures. Examples thereof are lithium phenoxide, lithium 2,2,2-trifluoroethoxide, n-butyllithium and tetramethylammonium hydroxide. Also useful are various weakly basic salts such as sodium benzoate and lithium stearate.

Another class of basic catalysts is disclosed in U.S. Pat. No. 4,701,519, the disclosure of which is also incorporated by reference herein. It comprises polymers containing alkali metal phenoxide and especially lithium phenoxide moieties. They are usually present as end groups, especially on linear polycarbonates having a number average molecular weight in the range of about 8,000-20,000 as determined by gel permeation chromatography relative to polystyrene. Such catalysts may be produced by reacting a suitable polymer with an alkali metal base, typically at a temperature in the range of about 200°-300° C.

A particularly useful class of Lewis bases, disclosed in U.S. Pat. No. 4,605,731, includes numerous tetraarylborate salts, including lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate. The preferred catalysts within this class are the tetra-n-alkylammonium and tetra-n-alkylphosphonium tetraphenylborates. Tetramethylammonium tetraphenylborate is particularly preferred because of its high activity, relatively low cost and ease of preparation from tetramethylammonium hydroxide and an alkali metal tetraphenylborate.

Lewis acids useful as polycarbonate formation catalysts include dioctyltin oxide, triethanolaminetitanium isopropoxide, tetra(2-ethylhexyl) titanate and polyvalent metal (especially titanium and aluminum) chelates such as bisisopropoxytitanium bisacetylacetonate (commercially available under the tradename "Tyzor AA") and the bisisopropoxyaluminum salt of ethyl acetoacetate. Among the preferred catalysts are lithium stearate and bisisopropoxytitanium bisacetylacetonate.

The linear polycarbonate formation reaction is typically effected, by merely contacting the cyclic oligomer mixture, either purified or in crude form, with the catalyst at temperatures up to 350° C., preferably about 200°-300° C., until polymerization has proceeded to the extent desired. Although the use of a solvent is within the scope of the invention, it is generally not preferred. In general, the amount of catalyst used is about 0.001-1.0 mole percent based on carbonate structural units in the oligomer composition.

Conversion of macrocyclic polyester oligomers to linear polyesters is normally achieved by contacting the macrocyclic oligomer composition with a transesterification catalyst at a temperature in the range of about 200°-300° C. Compounds useful as catalysts include those known in the art to be useful for the preparation of linear polyesters from dihydroxy compounds and alkyl dicarboxylates. These include basic compounds such as lithium hydroxide, lithium phenoxide and sodium phenoxide. Also useful are various Lewis acids, especially tetraalkyl titanates such as tetraethyl, tetrabutyl and tetraoctyl titanate. The amount of catalyst used is generally in the range of about 0.1-1.5 mole percent based on structural units in the macrocyclic polyarylate oligomers. The polymerization reaction is typically carried out in the melt, although solution polymerization in such high boiling solvents as 2,4-dichlorotoluene or 1,2, 4-trichlorobenzene are also contemplated, as is solution polymerization in more volatile solvents under pressure.

Macrocyclic polyamide oligomers, as well as polyamideimides, may be converted to copolyamides by reaction with at least one lactam of the formula

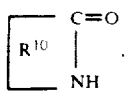

wherein $R^{10}$ is a divalent aliphatic hydrocarbon or substituted hydrocarbon radical containing a chain of about 2-20 carbon atoms, in the presence of a basic reagent. This method and the copolyamides thus produced are another aspect of the invention.

Any of a number of known lactams may be used. Preferred are those in which $R^{10}$ is a straight alkylene chain containing about 4-12 carbon atoms. Illustrative lactams are pivalolactam, δ-valerolactam, ε-caprolactam and laurolactam, in which $R^{10}$ is $CH_2C(CH_3)_2$, $(CH_2)_4$, $(CH_2)_5$ and $(CH_2)_{11}$, respectively. ε-Caprolactam is especially preferred.

The basic reagents include inorganic bases such as the alkali and alkaline earth metals and their hydrides, hydroxides, carbonates and alkoxides, and strong organic bases such as tetraalkylammonium hydroxides, guanidines, and organometallics including Grignard reagents and organolithium reagents. The alkali metal hydrides, especially sodium hydride, are preferred.

The reaction between the lactam, basic reagent and macrocyclic polyamide oligomer composition typically takes place at elevated temperatures. In general, temperatures of about 25°-200° C., preferably about 90°-150° C., are adequate to effect reaction of the lactam with the basic reagent to form an anionic intermediate, which subsequently reacts with the oligomer composition at temperatures in the range of about 200°-300° C. The proportions of lactam and oligomer composition are not critical but may be varied according to the desired stoichiometry of the product.

As previously mentioned, the preferred macrocyclic polyimide oligomers of this invention are polyamideimides and those in which $Z^2$ is sulfur or a disiloxane moiety, or in which $Z^3$ has formula VIII (i.e., contains a disiloxane moiety), since these functionalities optimize the ease of converting said macrocyclic oligomers to linear polyimides.

For example, the macrocyclic polyimides wherein $Z^2$ is sulfur may be converted to linear polyimides by reaction with at least one basic sulfide of the formula $M—S—X^2$, wherein M is an alkali metal (usually sodium) and $X^2$ is M or an aryl radical, preferably phenyl. The basic sulfide is generally employed in the amount of about 2-10 mole percent, preferably about 3-6 mole percent, based on structural units in the cyclic imide composition. The polymerization reaction may be conducted in bulk or in solution, typically in a polar aprotic solvent such as dimethylformamide, dimethylacetamide or dimethyl sulfoxide, and is generally conducted at temperatures in the range of about 150°-225° C. The polymerization mechanism involves ring-opening of the cyclic imide at the sulfur atom.

Macrocyclic polyimides containing a disiloxane group can be polymerized by the action of a strongly acidic catalyst such as methanesulfonic or trifluoromethanesulfonic acid, a basic catalyst such as an alkali metal phenate, or an alkali metal fluoride. Among the latter, cesium fluoride is frequently preferred because of its high solubility in the macrocyclic disiloxane polyimides. It is also possible to incorporate in the polymerization mixture a cyclic polysiloxane such as cyclooctamethyltetrasiloxane, to increase the molecular weight of the polysiloxane blocks in the linear polyimide product.

The proportion of catalyst in the mixture, based on macrocyclic polyimide and cyclic polysiloxane present, may vary widely and is typically about 0.001-10.0 mole percent. Polymerization temperatures are typically in the range of about 125°-200° C. It may sometimes be advantageous to employ a non-polar solvent such as o-dichlorobenzene or 1,2,4-trichlorobenzene as a reaction medium.

Macrocyclic polyethersulfones and polyetherketones may be converted to corresponding linear polymers by heating with a catalytic amount, typically about 0.5-2.0 mole percent, of a base. Suitable bases include alkali metal phenates, particularly di-(alkali metal) salts of bisphenols. Reaction temperatuers of about 350°-400° C. are typical.

The preparation of linear polymers from the macrocyclic oligomer compositions of this invention is illustrated by the following examples.

EXAMPLES 53-54

Tetra-n-butylammonium tetraphenylborate was added to 1 gram each of the macrocyclic copolymeric and homopolymeric spirobiindane bisphenol polycarbonate oligomers of Examples 6 and 12, and the mixtures were dissolved in 25 ml. of dry methylene chloride. The solutions were evaporated to dryness under vacuum and further for 4 hours at 110° C. in a nitrogen atmosphere. The solids were heated under nitrogen for 1 hour at 300° C. The polymeric products thus formed were dissolved in methylene chloride, reprecipitated by pouring into methanol, filtered and dried. The relevant parameters and properties are given in the following table.

| Example | 53 | 54 |
|---|---|---|
| Cyclic product of Example | 6 | 12 |
| Catalyst, mole % | 0.12 | 0.1 |
| Mw | 105,400 | 26,740 |
| Tg. °C. | 188.4 | 202 |

EXAMPLE 55

There were dissolved in 40 ml. of methylene chloride 8 mg. of tetra-n-butylammonium tetraphenylborate and 1.6 grams of the product of Example 13. The solution was vacuum stripped and the solids were dried at reduced pressure under nitrogen at 110° C. The dried product was heated for 15 minutes at 285° C. under nitrogen. The resulting copolycarbonate had a weight average molecular weight of 35,000 and a number average molecular weight of 13,000, both as determined by gel permeation chromatography relative to polystyrene.

EXAMPLE 56

The procedure of Example 55 was repeated, substituting 1.5 grams of the product of Example 14 for the product of Example 13. The resulting copolycarbonate had a weight average molecular weight of 46,000 and a number average molecular weight of about 17,600.

EXAMPLE 57

To a solution of 0.5 gram of macrocyclic SBI isophthalate oligomer in 15 ml. of methylene chloride was added 1.5 mg. of tetrabutyl titanate. The solution was agitated thoroughly and the methylene chloride was removed by evaporation. The residue was heated for 45 minutes under nitrogen at 285° C., whereupon there was obtained a linear polyarylate insoluble in methylene chloride. Upon extraction of low molecular weight polymer with tetrahydrofuran, a high molecular weight material having a glass transition temperature of 243° C. was obtained.

EXAMPLE 58

A mixture of 7.5 grams of a macrocyclic polyamide oligomer mixture similar to that of Example 20, 7.5 grams of caprolactam and 237 mg. (15 mole percent based on caprolactam) of sodium hydride was heated in a test tube at 140° C. in a nitrogen atmosphere for 1 hour, during which time melting occurred and hydrogen was evolved. It was then heated for 10 minutes at 265° C. and cooled. The solid product was removed by breaking the test tube and a portion thereof was dissolved in chloroform and treated with trifluoroacetic anhydride, whereupon the polymer dissolved. Gel permeation chromatographic analysis of the solution showed the presence of a copolyamide having a number average molecular weight of 22,000 and a weight average molecular weight of 47,000.

EXAMPLE 59

A mixture of 1 gram of the crude macrocyclic polyamideimide oligomer mixture of Example 40, 10 grams of caprolactam and 290 mg. of sodium hydride was heated in a test tube at 150° C. in a nitrogen atmosphere for ½ hour, during which time melting occurred and hydrogen was evolved. It was then heated for 12 minutes at 230° C. and cooled. The solid product was extracted with tetrahydrofuran, leaving as the insoluble product a linear copolyamideimide having a weight average molecular weight of 27,000.

EXAMPLE 60

A 30% solids solution in dimethylacetamide of the substantially linear-free macrocyclic imide composition of Example 37 and 5 mole percent (based on structural units in said macrocyclic [polyimide] *imide* of sodium sulfide was heated at 200° C. for 40 minutes. Analysis of the resulting solution by gel permeation chromatography indicated the presence of a polymer having a number average molecular weight of about 140,000, as well as low oligomers such as the BPADA cyclic monoimide. The solution was spread on a glass plate and heated in vacuum at 160° C., yielding a polymer film of good integrity. The glass transition temperature of the polymer was 230° C., identical to that of the extraction residue from Example 37.

EXAMPLE 61

The procedure of Example 60 was repeated, substituting lithium sulfide for the sodium sulfide. A similar product was obtained after a somewhat longer reaction time.

EXAMPLE 62

A mixture of 78 mg. of the substantially linear-free macrocyclic imide composition of Example 38, 0.023 ml. of a 0.02 M solution of the sodium salt of thiophenol in dimethylacetamide and 0.4 ml. of dry dimethylacetamide was heated at 200° C. for about 1 hour, spread on a glass plate and heated in vacuum at 180° C. for an additional hour as the solvent was evaporated. There was obtained a linear polyimide which was shown by gel permeation chromatography to have a number average molecular weight of about 20,000.

EXAMPLE 63

A toluene solution of 1 gram (1.9 mmol.) of the macrocyclic polyethersulfone oligomer product of Example 45 and 5 mg. (0.02 mmol.) of the disodium salt of bisphenol A was distilled to remove the toluene. The vessel containing the residue was heated in a salt bath at 380°–400° C. for 15 minutes and cooled to room temperature. The solid product was dissolved in chloroform and analyzed by high pressure liquid chromatography and gel permeation chromatography, which showed the presence of linear polyethersulfone having a weight average molecular weight of about 80,000.

EXAMPLE 64

A solution of 26.7 mg. of the macrocyclic siloxane polyetherimide monomer product of Example 42 and 1 microliter of methanesulfonic acid in 100 ml. of 1,2,4-trichlorobenzene was heated at 140° C. for one hour, with periodic analysis by gel permeation chromatography. After 40 minutes, the weight average molecular weight relative to polystyrene was about 20,000 and no further increase was noted.

The solution was poured onto a glass plate and allowed to thicken overnight. It was then heated in a vacuum oven for 2 hours at 140° C., yielding a clear, colorless film with excellent integrity. The film had a weight average molecular weight of about 200,000 and a glass transition temperature of 109° C.

EXAMPLE 65

A mixture of 25 mg. of the macrocyclic siloxane polyetherimide monomer product of Example 42 and 1 microliter of methanesulfonic acid was heated for 10 minutes at 250° C., after which gel permeation chromatographic analysis showed a weight average molecular weight relative to polystyrene of 26,200. The product was cooled, dissolved in chloroform and cast on a glass slide which was then heated for 1 hour at 140° C., to produce a polymer film with a molecular weight of 39,800.

EXAMPLE 66

A solution of 600 mg. (0.68) mmol.) of the macrocyclic siloxane polyetherimide of Example 44 and 8 mg. (0.06 mmol.) of sodium p-cresoxide in 1.8 ml. of o-dichlorobenzene was heated under reflux in a nitrogen atmosphere for 4 hours, with stirring. The solution was cooled and poured slowly into 50 ml. of hexane, with stirring, and the solid polymer which precipitated was filtered and dried. It had a weight average molecular weight relative to polystyrene of 15,000.

EXAMPLE 67

A solution of 130 mg. (0.15) mmol.) of the macrocyclic siloxane polyetherimide of Example 44, 220 mg. (0.74 mmol.) of octamethylcyclotetrasiloxane and 2 microliters (0.02 mmol.) of trifluoromethanesulfonic acid in 1.5 ml. of 12 freshly distilled chloroform was heated under nitrogen for hours at 60° C., with stirring. Upon analysis by gel permeation chromatography, the product was found to comprise 80% by weight of a polyetherimide polysiloxane having a weight average molecular weight of 8,000.

What is claimed is:

1. A composition comprising random macrocyclic monomer and oligomer compounds corresponding to the formula $$(A^1-Z^1)_a(R^1-Z^1)_b$$

wherein the $Z^1$ radicals are identical linking groups; $A^1$ is a spiro (bis)indane moiety of the formula

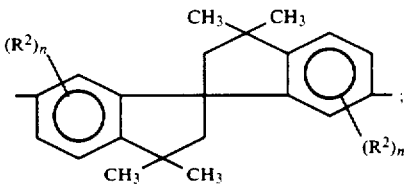

(II)

about 60% of the $R^1$ groups are divalent aromatic organic radicals and the balance thereof are divalent aliphatic, alicyclic or aromatic organic radicals; each $R^2$ is independently $C_{1-4}$ primary or secondary alkyl or halo; a is from 1 to about 12, b is from 0 to 90% of total $-A^1-Z^1-$ and $-R^1-Z^1-$ moieties and n is 0–3.

2. A composition according to claim 1 wherein n is 0.

3. A composition according to claim 1 wherein the compounds contain at least one $-R^1-Z^1-$ group.

4. A composition according to claim 3 wherein $R^1$ is

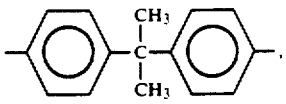

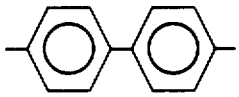

or

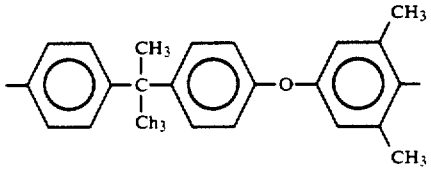

5. A composition according to claim 1 which comprises macrocyclic polyamides.

6. A compositon according to claim 5 which comprises structural units of the formula $$-NH\left(R^4-O\right)_p A^1\left(O-R^4\right)_p NH-\overset{O}{\overset{\|}{C}}-R^5-\overset{O}{\overset{\|}{C}}-, \quad \text{(VI)}$$

wherein:

$R^4$ is a substituted or unsubstituted $C_{2-4}$ alkylene, m-phenylene or p-phenylene radical;

$R^5$ is a substituted or unsubstituted alkylene radical or arylene radical other than o-arylene; and p is 0 or 1.

7. A composition according to claim 6 wherein $R^5$ is m-phenylene and p is 0.

8. A composition according to claim 6 wherein $R^4$ is m- or p-phenylene; $R^5$ is $A^1$, m-phenylene,

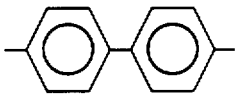

or

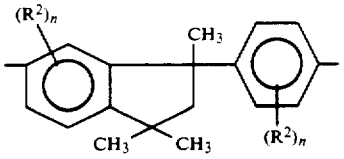

and p is 1.

*9. A composition according to claim 5 which comprises structural units of the formula*

$$-\overset{O}{\overset{\|}{C}}-A^1-\overset{O}{\overset{\|}{C}}-NH-A^4-NH-, \quad \text{(VII)}$$

*wherein $A^4$ is a monocyclic or bicyclic m- or p-linked arylene radical or*

$$-R^3-\underset{\underset{R^6}{|}}{\overset{\overset{R^6}{|}}{Si}}-O-\underset{\underset{R^6}{|}}{\overset{\overset{R^6}{|}}{Si}}-R^3-. \quad \text{(VIII)}$$

$R^3$ is a divalent aliphatic or m- or p-linked monocyclic aromatic or alicyclic radical, and $R^6$ is $C_{1-4}$ primary or secondary alkyl, phenyl or substituted phenyl.

10. A composition according to claim 9 wherein $A^4$ is m-phenylene,

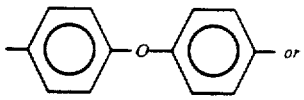

or

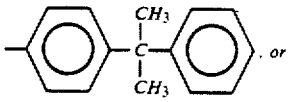

. or has formula VIII wherein $R^3$ is trimethylene and $R^6$ is methyl.

11. A composition according to claim 5 wherein n is 0.

12. A composition according to claim 1 which comprises macrocyclic polyimides.

13. A composition according to claim 12 which comprises structural units of the formula

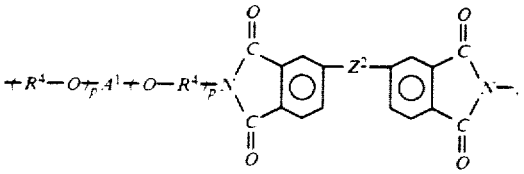

(IX)

wherein:

$Z^2$ is a single bond, a divalent aliphatic or alicyclic radical containing about 1-12 carbon atoms, —O—, —CO—, —S—, —$SO_2$—, —O—Q—O—, —$SO_2$—Q—$SO_2$—,

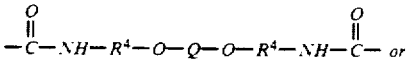

or

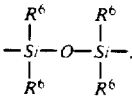

Q is a divalent aliphatic or aromatic radical;

$R^4$ is a substituted or unsubstituted $C_{2-4}$ alkylene, m-phenylene or p-phenylene radical;

$R^6$ is $C_{1-4}$ primary or secondary alkyl, phenyl or substituted phenyl; and p is 0 or 1.

14. A composition according to claim 13 wherein $Z^2$ is —S— and p is 0.

15. A composition according to claim 13 wherein $Z^2$ is S,

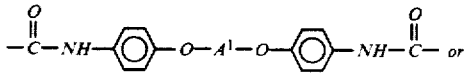

or

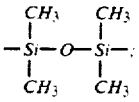

$R^4$ is p-phenylene and p is 1.

16. A composition according to claim 12 which comprises structural units of the formula

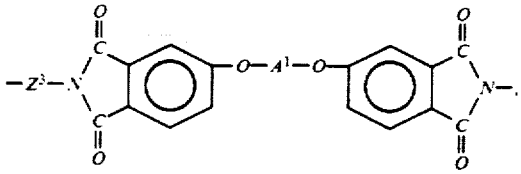

(X)

wherein:

$Z^3$ is $R^3$, —$R^4$—$Z^4$—$R^4$— or

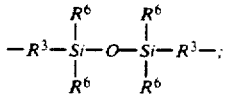

(VIII)

$Z^4$ is

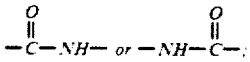

$R^3$ is a divalent aliphatic or m- or p-linked monocyclic aromatic or alicyclic radical;

$R^4$ is a substituted or unsubstituted $C_{2-4}$ alkylene, m-phenylene or p-phenylene radical; and $R^6$ is $C_{1-4}$ primary or secondary alkyl, phenyl or substituted phenyl.

17. A composition according to claim 16 wherein $Z^3$ is m-or p-phenylene,

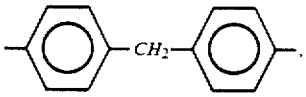

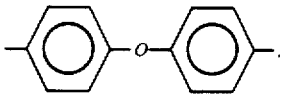

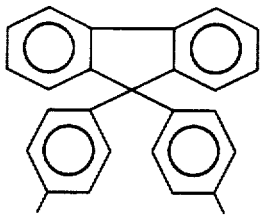

or

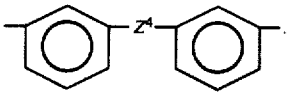

18. A composition according to claim 16 wherein n is 0.

19. A composition according to claim 1 which comprises macrocyclic polyetherketones or polyethersulfones comprising structural units of the formula

—O—$A^1$—O—$A^5$—, (XI)

wherein $A^5$ is an aromatic radical containing at least one —CO— or —$SO_2$ group.

*20. A composition according to claim 19 wherein $A^5$ is*
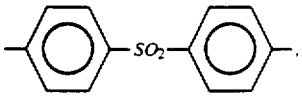
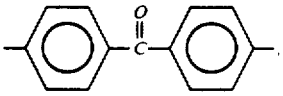
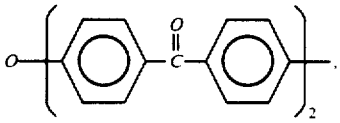
-continued
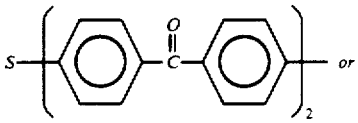
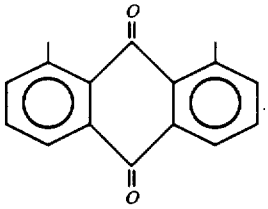
*21. A composition according to claim 19 wherein n is 0.*
* * * * *